Figure 1:
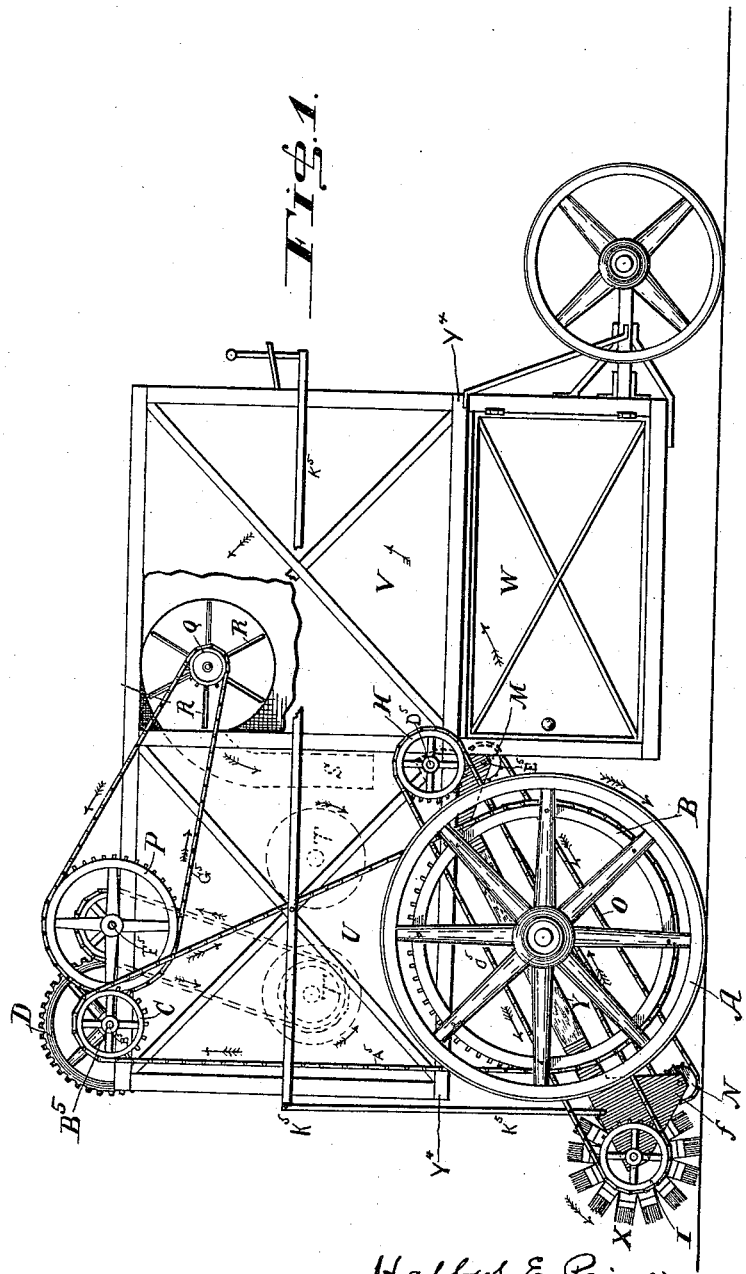

(No Model.)

H. E. PAINE.
STREET SWEEPER.

No. 433,958.   Patented Aug. 12, 1890.

WITNESSES
Clarence A. Brandenburg
Walter Scott

Halbert E. Paine
INVENTOR
By Paine and Ladd
Attorneys (No Model.) 11 Sheets—Sheet 3.

H. E. PAINE.
STREET SWEEPER.

No. 433,958. Patented Aug. 12, 1890.

WITNESSES
Clarence A. Brandenburg.
Walter Scott.

INVENTOR
Halbert E. Paine
By Paine and Ladd
Attorneys

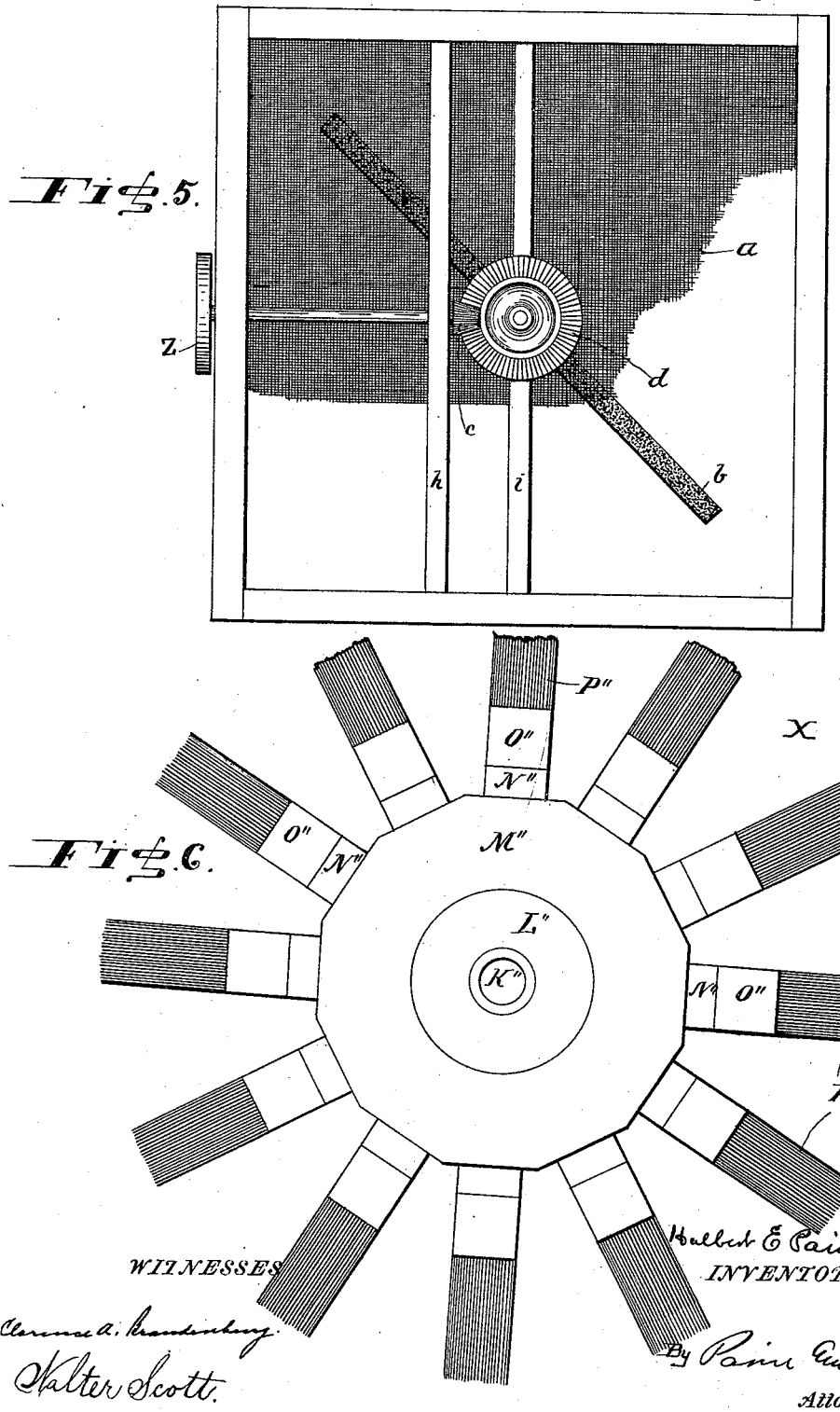

(No Model.)  11 Sheets—Sheet 5.

H. E. PAINE.
STREET SWEEPER.

No. 433,958.  Patented Aug. 12, 1890.

WITNESSES
Clarence A. Brandenburg.
Walter Scott.

Halbert E. Paine
INVENTOR
By Paine and Ladd
Attorneys (No Model.)  11 Sheets—Sheet 6.
H. E. PAINE.
STREET SWEEPER.
No. 433,958.  Patented Aug. 12, 1890.
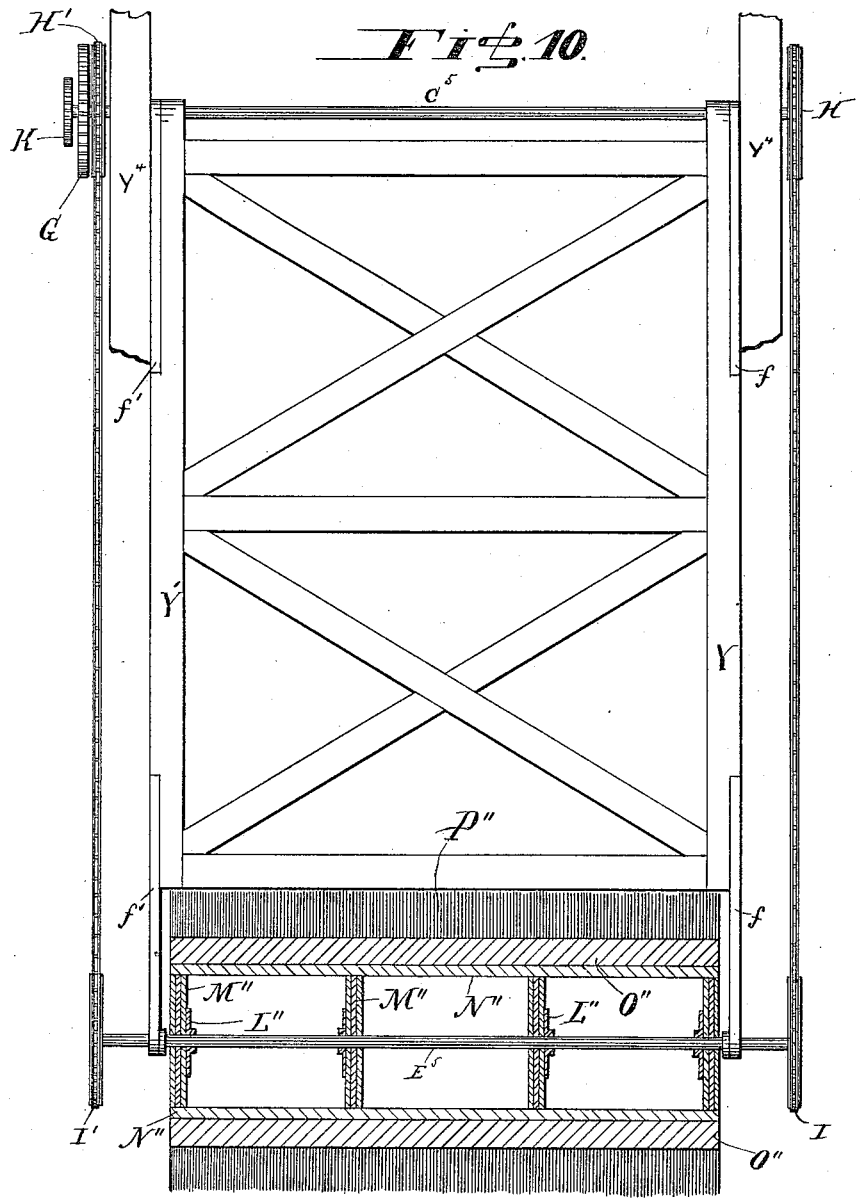

(No Model.) 11 Sheets—Sheet 7.

H. E. PAINE.
STREET SWEEPER.

No. 433,958. Patented Aug. 12, 1890.

WITNESSES

INVENTOR
Halbert E. Paine
By Paine and Ladd
Attorneys (No Model.) 11 Sheets—Sheet 8.

H. E. PAINE.
STREET SWEEPER.

No. 433,958. Patented Aug. 12, 1890.

WITNESSES

H. E. Paine.
INVENTOR (No Model.) 11 Sheets—Sheet 9.
H. E. PAINE.
STREET SWEEPER.
No. 433,958. Patented Aug. 12, 1890.
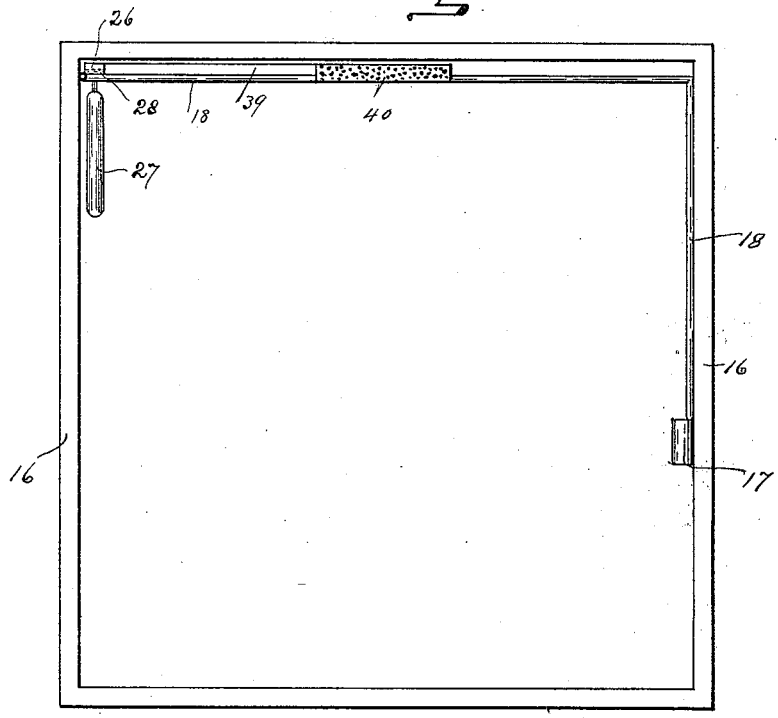
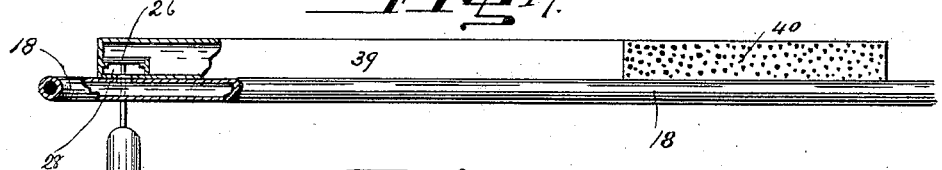
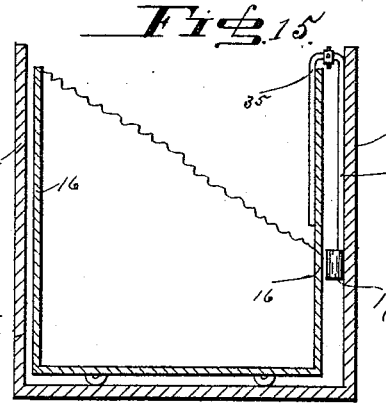
WITNESSES
INVENTOR
H. E. Paine.

(No Model.) 11 Sheets—Sheet 10.

H. E. PAINE.
STREET SWEEPER.

No. 433,958. Patented Aug. 12, 1890.

WITNESSES

H. E. Paine.
INVENTOR (No Model.) 11 Sheets—Sheet 11.
H. E. PAINE.
STREET SWEEPER.
No. 433,958. Patented Aug. 12, 1890.
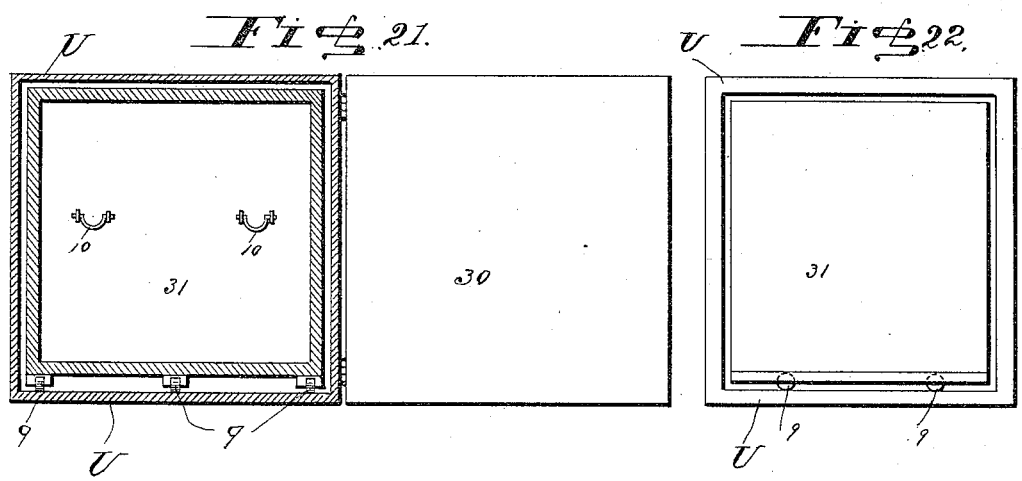
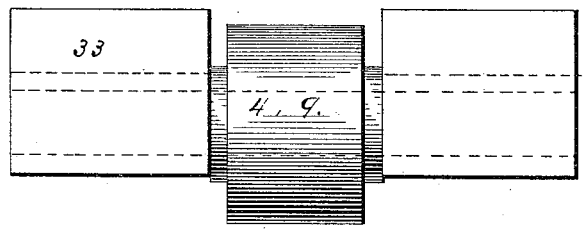
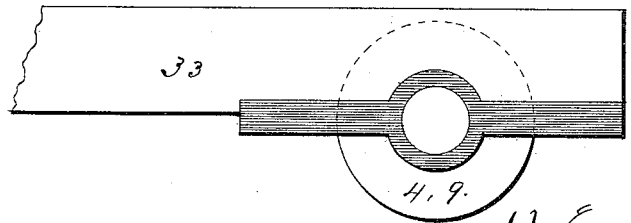
WITNESSES
INVENTOR

United States Patent Office.

HALBERT E. PAINE, OF WASHINGTON, DISTRICT OF COLUMBIA.

STREET-SWEEPER.

SPECIFICATION forming part of Letters Patent No. 433,958, dated August 12, 1890.

Application filed December 23, 1889. Serial No. 334,683. (No model.)

*To all whom it may concern:*

Be it known that I, HALBERT E. PAINE, a citizen of the United States, residing at Washington, in the District of Columbia, have invented certain new and useful Improvements in Street-Sweepers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists of an improvement on that for which Letters Patent of the United States No. 328,057 were granted to me on the 13th day of October, 1883. Its objects, like those of the invention patented in said Letters Patent No. 328,057, are, first, to render it practicable to sweep streets without wetting them and at the same time to avoid the dust raised by the use of the ordinary sweepers on dry streets; second, to render it practicable to sweep streets in the day-time, so as to avoid the annoyance occasioned by the use of street-sweepers at night; third, to avoid the noise and dust made by the laborers and carts following the machines in common use for the purpose of collecting and removing the dirt. These results are secured by conducting the finer portions of the sweepings of dust and dirt into or through a chamber largely filled with spray, or through a space charged with spray, in such a way that all the particles of dust are caught and carried down into a receptacle with the spray. By this operation the dust raised and brought into a sweeping-machine by the brushes and blowers is instantly moistened and the disagreeable consequences of its escape into the open air wholly prevented. None that enters the machine escapes from it, and therefore as the suction of the blowers tends to draw all the dust raised by the brushes into the machine, it becomes practicable to use the machine on dry streets and in the day-time without occasioning such nuisances as attend the use of ordinary street-sweepers. Moreover, since the machine collects and carries with it all the dirt swept up in its progress, the confusion and annoyance incident to the operations of a force of sweepers and shovelers, with their carts, following a dust-raising sweeping-machine, are wholly obviated, and the streets can be swept at any time of the day or night without prior sprinkling and without any annoyance to persons riding on the streets or walking on the sidewalks or to occupants of places of business or of private residences; and the invention consists, primarily, of a sweeping-machine having mechanism arranged to produce an atmosphere of spray within a dust-receiving chamber to catch and precipitate the dust, together with brushing or sweeping and conveying mechanism for collecting the dirt and conveying it into the machine, and a removable dirt-receptacle, all as hereinafter described and claimed.

So far as the main feature of the invention is concerned, it is not material by what devices the atmosphere of spray is produced. Any means capable of producing it may be used instead of the paddles or beaters herein shown and described. For example, the water may be forced up through a pipe to the top of the chamber and then discharged through perforated pipes or through sprinkler-nozzles.

In my device patented in Letters Patent No. 328,057 the dirt is all forced into the dirt-chamber by the action of the revolving brush co-operating with the fan-blower without any endless apron to carry up the heavier parts; but I now combine the action of an endless apron with that of the revolving brush and fan-blower to facilitate the carrying of the heavier portions of the dirt up into the dirt-chamber. Again, in my device patented in Letters Patent No. 328,057 the dust is forced by a current of air through the inlet into the water in the removable tank, the water being not in the form of spray, but in a state of rest, except so far as agitated by the motion of the vehicle; but in the device for which I now ask Letters Patent the dust raised by the sweeping enters the spray produced by any proper means. For example, the spray may be produced by the rapid revolution of paddle wheels or beaters, and the dust may enter through an inlet into the body of the spray and the cleansed air pass out through an air-escape. When the water is at rest, the water-line is near the level of the axes of the paddle-wheels, which are actuated from above by bands or in any other convenient way. Less force is required to drive the dust into spray than into water in its ordinary state. There is a more perfect intermingling of the particles of dust-laden air with those of spray than with the particles of water when in its ordinary condition. Furthermore, in my device patented in Letters Patent No. 328,057 I found that light coarse dirt tended to clog the horizontal sieve between the dirt-chamber and the dust-chamber; but I now combine with the horizontal sieve a brush rotating in a horizontal plane beneath and against the horizontal sieve and keeping it clean.

In order clearly to explain the improvements for which I now ask Letters Patent I shall find it convenient to set forth in this application several of the features described and claimed in my Letters Patent, No. 328,057; but I claim in this application nothing that was claimed or patented in said Letters Patent No. 328,057.

Figure 2:
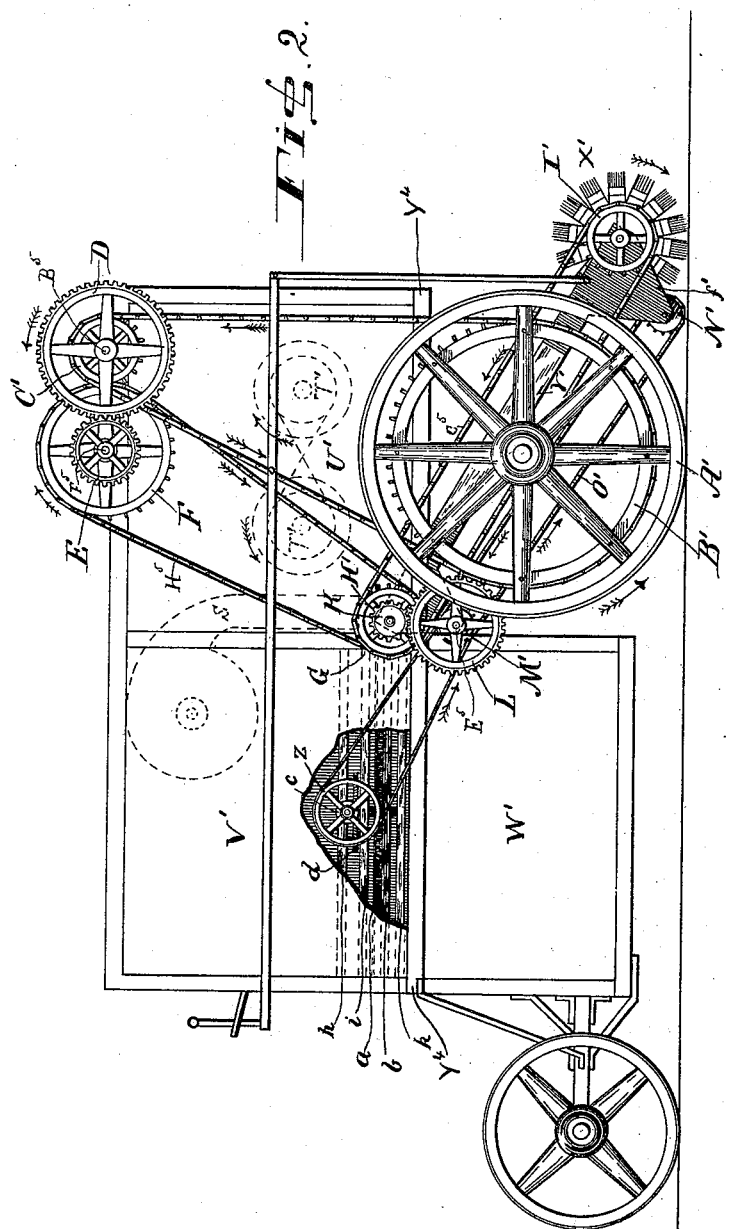
Figure 3:
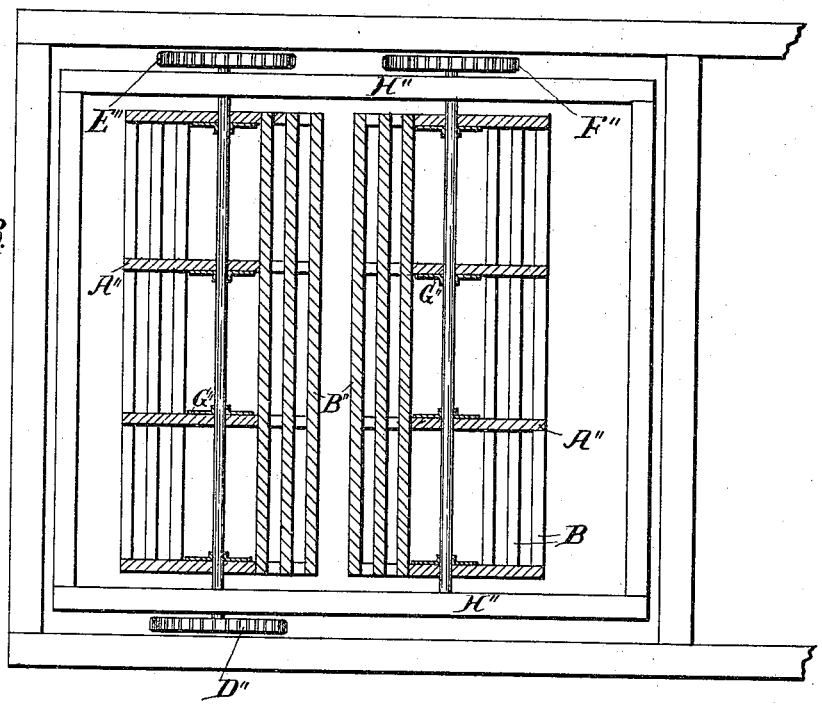
Figure 4:
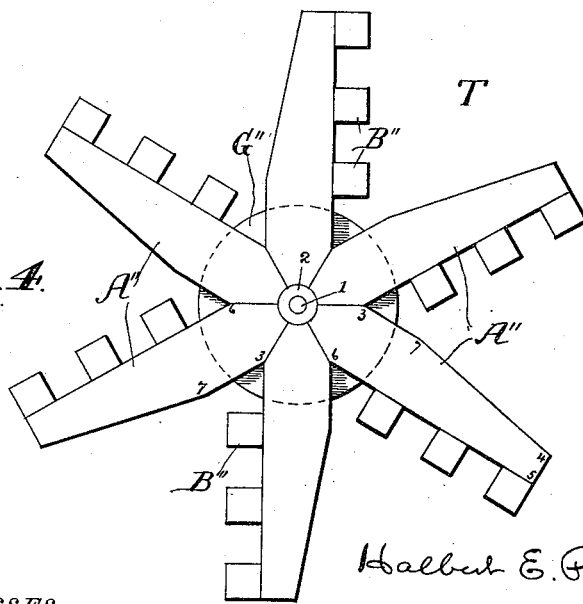
Figure 7:
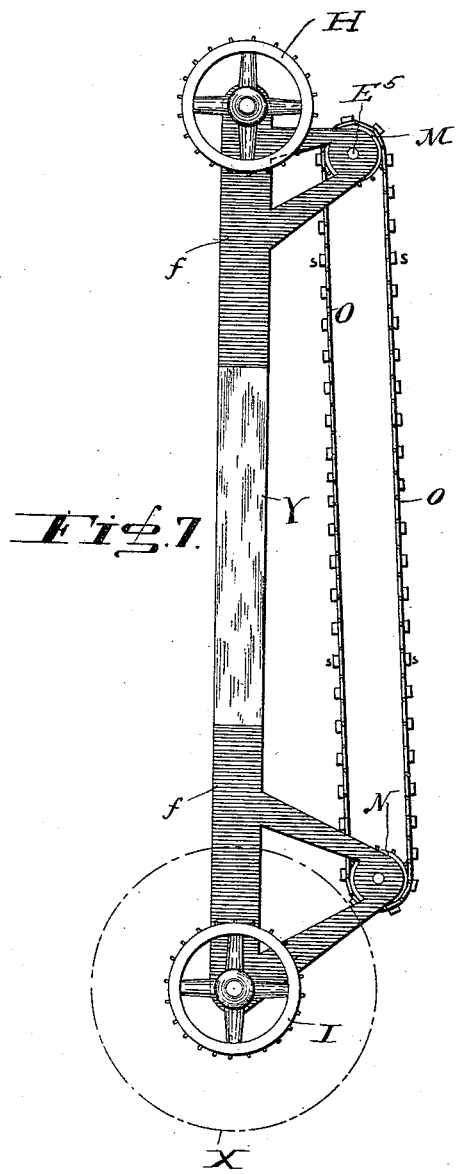
Figure 8:
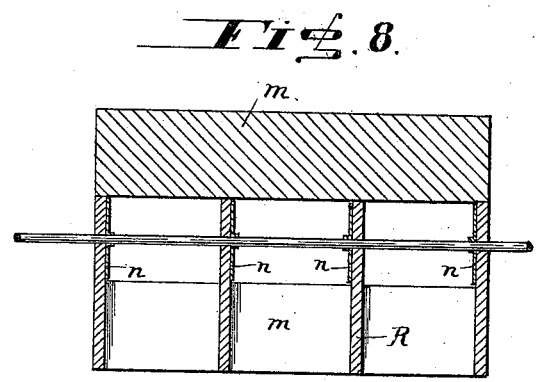
Figure 9:
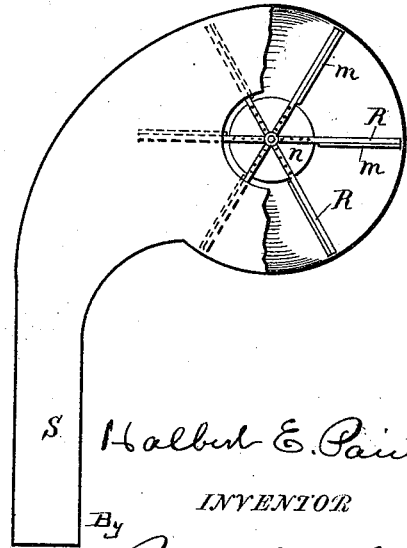
Figure 12:
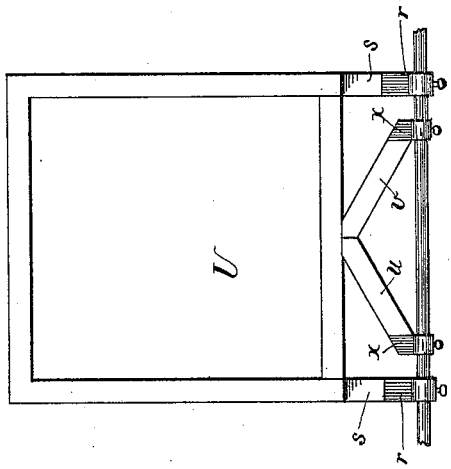
Figure 11:
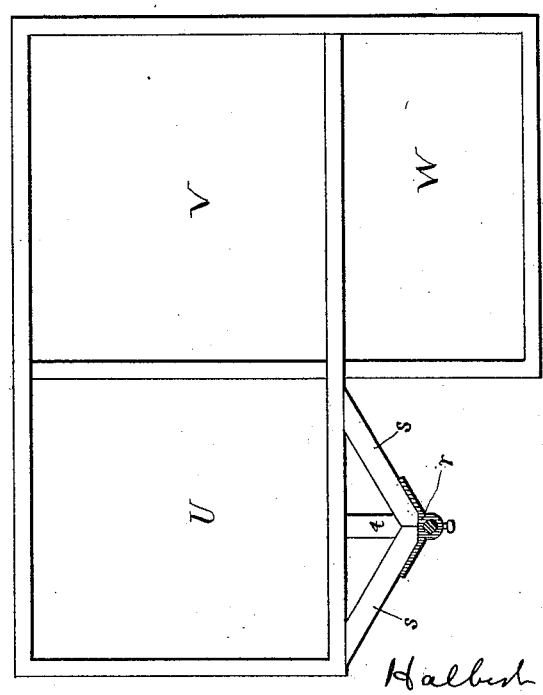
Figure 25:
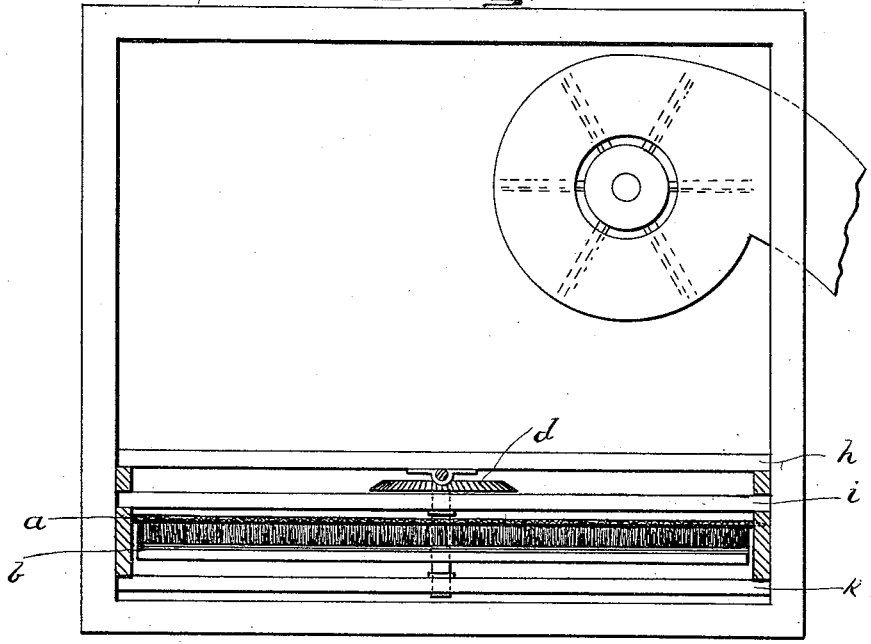
Figure 13:
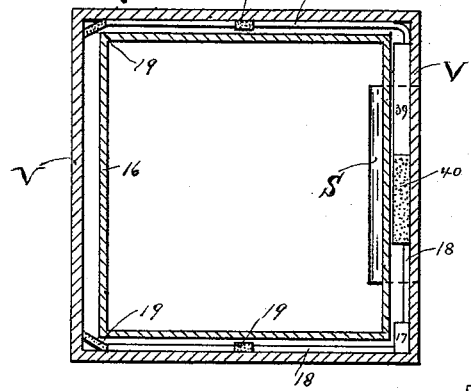
Figure 14:
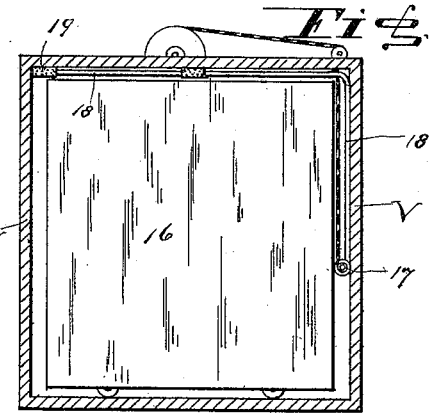
Figure 18:
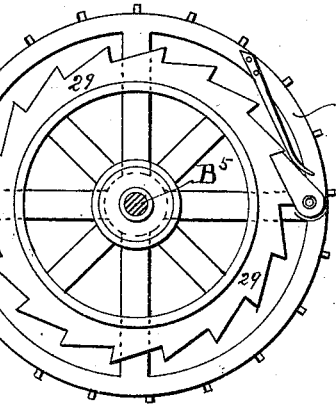
Figure 19:
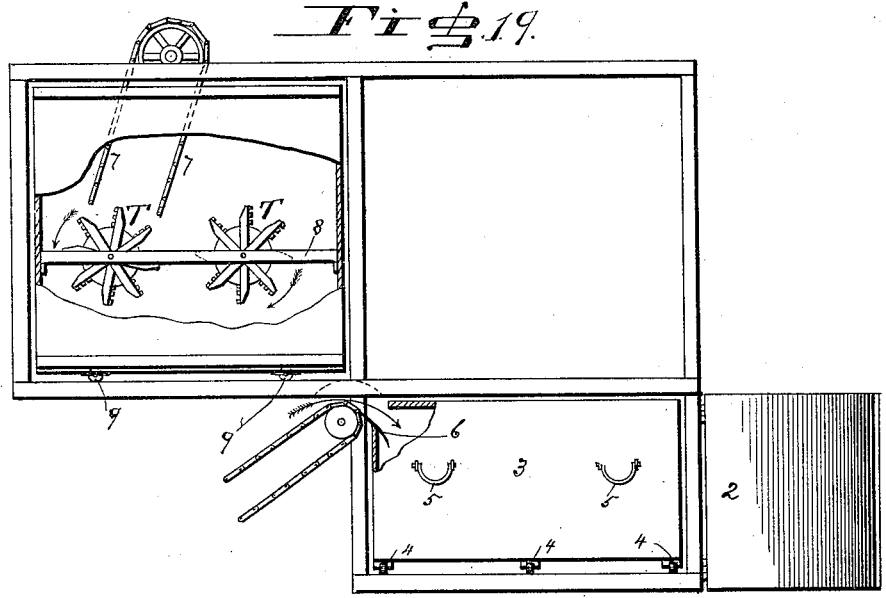
Figure 20:
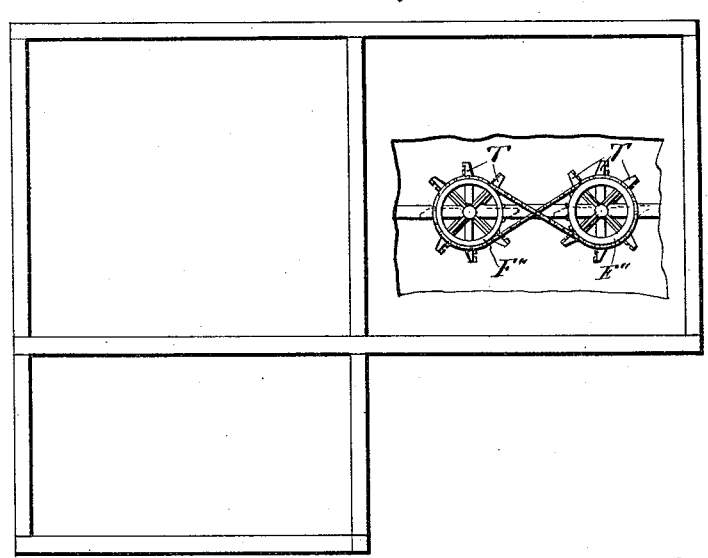

In the drawings hereto attached, Figure 1 represents the right side of the complete machine with parts of the dust-chamber and fan-blower case broken away, so as to disclose the fan-blower with the paddle-wheels in the water-tank represented by dotted lines, but without the curtain exhibited and marked C in my Letters Patent No. 328,057, which is here omitted in order more clearly to exhibit the remaining parts. Fig. 2 represents the left side of the complete machine with a part of the dust-chamber broken away to show the operation of the brush upon the sieve with dotted lines for the paddle-wheels, but without the curtain. Fig. 3 represents a plan of the water-tank and paddle-wheels. Fig. 4 represents one of the extremities of one of the paddle-wheels. Fig. 5 represents a plan of the sieve with the brush revolving in a horizontal plane below and against it. Fig. 6 shows one of the extremities of the rotary brush. Fig. 7 shows the endless apron, which carries the heavy portions of the earth up into the dirt-box, with the parts by which it is attached to the brush-frame. Fig. 8 represents a horizontal plan of the fan-blower. Fig. 9 shows the right side of the fan-blower case, with a part broken away to exhibit the fan-blower. Fig. 10 represents a plan of the rotating brush and of the brush-frame. Figs. 11 and 12 represent the frame-work whereby the rear axle supports the rear portion of the body of the machine. Figs. 13 and 14 represent, in plan and elevation, respectively, a device for producing spray in the water-tank by forcing the water up through perforated pipes or sprinkler-nozzles. Fig. 15 represents the water-chamber with the right side removed and a part of the disclosed water-tank broken away, so as to exhibit the siphon through which the water is drawn from the tank to the pump, which pump forces it up through the distributing-pipes and sprinkler-nozzles. The other parts of the machine, which are located within the water-chamber and water-tank, are omitted in the drawings. The sprinkler-nozzles may be dispensed with, and the pipes themselves perforated. Figs. 16 and 17 represent the safety-valve used to prevent excessive pressure on the pipes and sprinkler-nozzles. Fig. 18 represents the ratchet-connection between the sprocket-wheels C C' of Figs. 1 and 2 and the shaft on which revolves the gear-wheel D of Figs. 1 and 2. Fig. 19 represents the right side of the machine with the door of the dirt-chamber open, exposing to view the dirt-box within; also with the side of the water-chamber removed, showing the water-tank, the dirt-box having its side partly broken away, so as to exhibit the opening through which the dirt passes from the apron into the dirt-chamber. Fig. 20 represents the left side of the body of the machine with parts broken away to exhibit the spraying device. Fig. 21 represents the rear end of the machine with the door of the water-chamber open, disclosing the removable water-tank on wheels or rollers. Fig. 22 represents the water-chamber with the right side removed, so as to show the side of the removable water-tank with its rollers or wheels. Figs. 23 and 24 represent the rollers or wheels on which the dirt-box and water-tank are removed from and returned to their respective chambers. Fig. 25 represents the upper dust-chamber with the left side removed, so as to show the parts to which the brush $b$ is pivoted.

In Fig. 1, A is the right driving-wheel; B, a sprocket-wheel rigidly attached to the spokes of the wheel A and actuating the sprocket-wheel C by means of a rag-chain $A^5$. D is a gear-wheel on the left side of the machine, on the shaft $B^5$, which is rotated by the wheel C. This wheel C and the corresponding wheel C' of Fig. 2 have ratchet-connections with their shaft, so that neither one of them operates on the shaft when its driving-wheel is backing or is stationary, or is moving forward more slowly than the other driving-wheel. H is a sprocket-wheel, which by means of a rag-chain $C^5$ actuates the sprocket-wheel I and so rotates the brush X. This sprocket-wheel H is on the shaft $D^5$, which is rotated by the sprocket-wheel H' of Fig. 2. M is a sprocket-wheel, which actuates the sprocket-wheel N by means of a rag-chain O. This wheel is on the same shaft $E^5$ with the gear-wheel L and the sprocket-wheel M' of Fig. 2. P is a sprocket-wheel on the same shaft $F^5$ with the gear-wheel F of Fig. 2. It actuates the fan-blower R by means of the sprocket-wheel Q and a rag-chain $G^5$. S (dotted) shows the dust-inlet to the removable water-tank. T T (dotted) show the position of the paddle-wheels. U represents the outside of the permanent water-box, within which the removable tank and spray-chamber, Fig. 3, on wheels or rollers, is placed. V represents the outside of the dust-box, a part of which is broken away to disclose the fan-blower. W is the door of the permanent dirt-chamber, within which is placed the removable dirt-box, on wheels or rollers. Y represents a part of the brush-frame, and $f$ represents one of the iron plates by which the sprocket-wheels M and N are attached to the brush-frame, and $K^5$ is the hinged lever by which the brush is raised from the ground when not in use.

In Fig. 2, A' represents the left driving-wheel with the sprocket-wheel B' rigidly attached to its spokes and actuating the sprocket-wheel C', which, as already stated, has a ratchet-connection with its shaft $B^5$. D is a gear-wheel, which, through the gear-wheel E, actuates the sprocket-wheel F, and by means of a rag-chain $H^5$ the concealed sprocket-wheel G, (on the same shaft $D^5$ with H of Fig. 1,) which rotates its shaft and the sprocket-wheel H', which latter by means of a rag-chain $C^5$ actuates the sprocket-wheel I' on the shaft of the rotating brush. K is a gear-wheel on the same shaft with G and H'. It actuates the gear-wheel L on the shaft $E^5$, which carries the sprocket-wheel M of Fig. 1 and M' of Fig. 2, and drives the endless apron O O'. U represents the outside water-box; V, the outside of the dust-chamber, a part being cut away to show the operation of the brush on the sieve, and W represents the outside dirt-chamber. Z represents a band-wheel actuated by a wheel on the shaft $E^5$, which carries L and M'. The letter $a$ represents the horizontal sieve; $b$, the brush; $c$ and $d$, the gear-wheels; $h$, $i$, and $k$, the frame to support the parts, and $f'$ one of the iron plates by which the endless apron is attached to the brush-frame.

In Figs. 3 and 4, A" A", &c., represent the arms of the paddle-wheels; B" B", &c., the strips or pieces which form the paddles; G" G", &c., the iron disks to which the arms A" A" are rigidly attached. $K^5$ is the hinged lever by which the rotating brush is raised from the ground when not in use.

In Fig. 3, H" H", &c., represent sides of the removable water-tank; D", a band-wheel, actuated by a wheel directly above it on the shaft $B^5$, which carries the wheel C of Fig. 1 and wheels C' and D of Fig. 2. E" is a band-wheel which by a cross-band actuates the wheel F".

In Fig. 5 the small letter $a$ is the sieve; $b$, the brush revolving in a horizontal plane under and against the sieve; $c$ and $d$, the gear-wheels; $h$, $i$, and $k$, the frames, and Z is the band-wheel.

In Fig. 6, M" represents one of the four twelve-sided wooden blocks or plates which are attached to the shaft of the revolving brush by the iron disks L". N" N", &c., are strips, each of which is rigidly attached to all the blocks or plates M" M", &c., and extends from one extremity of the revolving brush to the other. O" P" are the brushes extending from one extremity of the revolving brush to the other and rigidly attached to the strips N" N", &c.

In Fig. 7, Y represents the right side of the brush-frame. M represents a sprocket-wheel which by means of the rag-chain O rotates the wheel N. On the left side of the brush-frame are the corresponding sprocket-wheels M' N' of Fig. 2, connected by the rag-chain O'. The sprocket-wheels M N and M' N' are at opposite extremities of two rollers of the same diameter as those sprocket-wheels, around which rollers moves the endless apron or conveyer, which is attached at the sides to the two rag-chains O and O'. The letters $s$ $s$, &c., represent the transverse ribs attached to the endless apron to move the heavy dirt. H is the sprocket-wheel, which by means of a rag-chain $C^5$ of Fig. 1 rotates the wheel I on the shaft of the revolving brush, and the letters $f f$ represent two of the four iron plates by which the endless apron and its appurtenances are connected with the brush-frame Y. On the left side of the brush-frame are two corresponding plates, marked $f'$ $f'$.

In Figs. 8 and 9, R represents one of the twenty-four wooden arms to which the six fan-blades $m$ are attached. These arms are fastened to the four iron disks $n$ $n$, &c., which are rigidly attached to the shaft.

In Fig. 10, $Y^4$ $Y^4$ represent parts of the frame of the water-box and dirt-box. Y and Y' are sides of the brush-frame. $f f f' f'$ represent iron plates, which connect the brush-frame with the shaft $D^5$, bearing the wheels H, H', G, and K, and with the shaft $E^5$ of the revolving brush. These plates also constitute the means by which the endless apron and its appurtenances are attached to the brush-frame. G is the concealed gear-wheel, Fig. 2, actuated by F, Fig. 2, which rotates the shaft $D^5$, on which revolve H and H', actuating by means of rag-chain $C^5$ the wheels I and I', and K is a gear-wheel, Fig. 2, which turns the wheel I, Fig. 2. M" M", &c., represent the four twelve-sided blocks or plates. These blocks or plates are attached to the shaft by the disks L" L", and to these blocks or plates are fastened the twelve strips N" N". The twelve brushes O" P" are attached to the strips N" N".

In Figs. 11 and 12, $r$, $s$, $t$, $u$, $v$, and $x$ represent parts of the frame-work of wood and iron, whereby the rear axle sustains the rear part of the body of the machine.

In Figs. 13 and 14, V indicates the water-chamber; 16, the removable water-tank on wheels or rollers; S, the dust-conduit; 17, the centrifugal (screw, force, or other) pump; 18, the pipes distributing the water; 39, the large escape-pipe; 40, the large sprinkler; and 19, the sprinkler-nozzles.

In Fig. 15 the letter V indicates the water-chamber; the number 16, the removable water-tank on wheels or rollers; 17, the pump, which may be a rotary, screw, piston, or other suitable pump; 35, the siphon, which conveys the water from the tank to the pump. When the water-tank is to be removed from the water-chamber, the two parts of the siphon are uncoupled, one part remaining attached to the water-chamber and the other part remaining attached to the water-tank. When the water tank is returned to the chamber, the two parts of the siphon are coupled together again by means of the hose-coupling device in common use, or any other equivalent device.

In Fig. 16 the number 16 indicates the water-tank; 17, the pump; 18, the distributing-pipe; 26, the safety-valve, held down by the weight 27; and 28, the water-chest, which is closed by the valve 26; 39, the large escape-pipe; and 40, the large sprinkler. The distributing-pipe 18 communicates with the water-chest 28.

In Fig. 17 the number 18 indicates the distributing-pipe; 26, the safety-valve, held down by the weight 27; 28, the water-chest, which is closed by the valve 26; 39, the large escape-pipe, into which the water passes from the water-chest when the valve 26 is forced up by the pressure; and 40, the large sprinkler at the end of the escape-pipe 39.

In Fig. 18, C indicates the sprocket-wheels C C' of Figs. 1 and 2, which wheels are loosely connected with their shaft. 29 indicates the ratchet-wheel, which is made fast to the shaft by a set-screw or otherwise.

In Fig. 19 the number 2 indicates the open door of the dirt-chamber; 3, the dirt-box; 4 4 4, the wheels or rollers; 5 5, the handles, by which the loaded dirt-box is drawn from the machine to the platform; 6, the shield, of leather, rubber, cloth, or other suitable material, lapping over the space between the rear end of the dirt-chamber and the rear end of the dirt-box to prevent dirt from dropping down into that space; T T, the paddles or beaters, the sprocket-wheel D'' of Fig. 3 being removed in order to disclose the paddles or beaters; 7, the rag-chain, by which the sprocket-wheel D'' of Fig. 3 and also the paddle-wheel T of Fig. 19 are driven. A sprocket-wheel E'', Fig. 3, on the opposite extremity of the shaft which bears the sprocket-wheel D'', Fig. 3, actuates by a cross-belt a corresponding sprocket-wheel F'', Fig. 3, on the shaft which bears the other paddle-wheel T'. The number 8 indicates the frame which supports the paddle-wheels. This frame rests upon cleats fastened to the front and rear ends of the box and is buttoned or otherwise fastened down when the machine is in operation. The numbers 9 9 indicate the wheels or rollers, on which the water-tank is moved in and out through the back door of the water-chamber.

In Fig. 20 the left side of the water-chamber is broken away to exhibit the paddle-wheels. The letters T T designate the paddle-wheels, and E'' F'' the sprocket-wheels. (Shown in Fig. 3.)

In Fig. 21, U indicates the rear end of the water-chamber with the door 30 open, disclosing the removable water-tank 31, which is moved out and in on the wheels or rollers 9 9 by means of the handles 10 10.

In Fig. 22, U indicates the water-chamber with the side removed, so as to show the removable water-tank 31 on wheels or rollers 9 9.

In Figs. 23 and 24, 4 9 indicate the wheels or rollers, and 33 the strips by which they are attached to the bottoms of the dirt-box and water-tank, respectively.

In Fig. 25, $a$ indicates the sieve; $b$, the brush; $d$, one of the gear-wheels, and $h$, $i$, and $k$ the frames.

Within the outer dirt-box W is placed a removable dirt-box without a cover, into which the dirt and dust are first drawn by the co-operation of the revolving brush, endless apron, and fan-blower. In this box the heavier and coarser portions remain until it is sufficiently charged, when it gives place to another similar box and is carried away and emptied of its contents.

The dust-chamber V, permanently attached to the body of the vehicle, has a close bottom for half of its length from the rear. In front it has a sieve-bottom, admitting the dust to the chamber, but excluding the coarser portions, which remain in the dirt-box W.

The fan-blower, aided by the blast of the revolving brush, forces the dust through the inlet S into the water and spray in the removable water-tank and dust-receptacle or chamber placed within the outer water-box U. The fan-blower is geared to a high velocity. When the water in the removable tank becomes charged with dirt, the tank is replaced by another containing pure water. The frame Y'' of the vehicle rests upon the rear and front axles. It is supported on the former by the devices shown in Figs. 11 and 12, but not shown in Figs. 1 and 2, or by any other convenient devices.

Any convenient devices may be used for communicating power from the wheels, but it is better to use both rear wheels, with ratchet-connections for the wheels C C', so that no inconvenience may result from turning the vehicle. In like manner any other convenient blowing device may be used.

I claim and desire to secure by Letters Patent—

1. In a street-sweeper, the combination of the revolving brush, the dirt-chamber, the dirt-box, the dust-receiving chamber, the water-chamber and water-tank communicating therewith, and the spray-forming mechanism located in the water-chamber, substantially as set forth.

2. In a street-sweeper, the combination of the revolving brush, the dirt-chamber, the dirt-box, the dust-receiving chamber, the water-chamber, the water-tank, the fan or blower located in the dust-receiving chamber and connected by the dust-conduit with the water-tank and water-chamber, and the spray-forming mechanism located in the latter chamber, substantially as set forth.

3. In a street-sweeper, the combination, with a sieve to screen the dust from the coarser material, of a brush revolving in contact with said sieve, substantially as and for the purpose set forth.

4. In a street-sweeper, a tank containing water, with mechanism for beating it into spray, in combination with a conduit, substantially as and for the purpose set forth.

5. In a street-sweeper, the combination, with a dust-receiving water-tank, of revolving paddles for converting the water into spray, substantially as and for the purpose set forth.

6. In a street-sweeper, the combination of a brush and endless conveyer, with a removable dirt-box, a sieve for screening the dust from the coarser material, a brush revolving in contact with said sieve, a blower mechanism, and a dust-receptacle adapted to hold water and having spray-forming mechanism, substantially as and for the purpose set forth.

In testimony whereof I affix my signature in presence of two witnesses.

HALBERT E. PAINE.

Witnesses:
STORY B. LADD,
CLARENCE A. BRANDENBURG.